Patented Dec. 22, 1942

2,306,330

UNITED STATES PATENT OFFICE 2,306,330

MANUFACTURE OF VITREOUS INSULATING MATERIAL

Phillip H. Dewey, Pittsburgh, Pa., assignor to Pittsburgh Plate Glass Company, Allegheny County, Pa., a corporation of Pennsylvania No Drawing. Application September 21, 1940, Serial No. 357,759

1 Claim. (Cl. 49—77)

The present invention relates to the manufacture of an insulating material having high resistance to chemical action, moisture and other deleterious agencies, and it has particular relation to the manufacture of such material from glass or a glass-like substance.

One object of the invention is to provide a process whereby cellular insulating material of the foregoing character can be prepared with a minimum expenditure of time, heat and apparatus.

A second object of the invention is to provide a process of preparing a cellular insulating material from glass or similar vitreous substances without necessity of first finely crushing the vitreous material.

These and other objects of the invention will be apparent from consideration of the following specification and the appended claims.

The use of glass in cellular or foam-like state as an insulating medium for buildings, refrigerators and the like has heretofore been proposed. Such foam of glass is resistant to moisture, water, decay and chemical action. It can also withstand relatively high temperatures without deterioration.

In certain patents, such as the British Patent No. 447,805, it is proposed to prepare such sponge or foam of glass by first finely crushing glass, then admixing it with carbon or carbonaceous material and heating the resultant mixture to the sintering temperature of the glass. As a result of such treatment, the carbonaceous material reacts with the glass to produce gases that form bubbles between the particles of glass. These bubbles apparently consist, at least in part, of sulphur dioxide generated by reduction of the sulfates naturally contained in most common glasses. The bubbles tend to grow and expand so that, ultimately, a highly cellular product is obtained.

Such process is not entirely satisfactory, because glass in pulverulent form is but a poor conductor of heat and considerable time and much fuel are required to heat the interior of the mass to the requisite temperature. Because of the prolonged heating, the outer surfaces are likely to become encrusted with an impermeable shell that acts as a barrier to outward permeation of the gases from the interior of the mass, thereby causing the formation of large bubbles adjacent to the surface. These larger bubbles of course constitute points of weakness in the mass. Moreover, their resistance to transmission of heat is less than that obtained by a multitude of smaller bubbles which in the aggregate are of the same volume as a larger bubble. Furthermore, in the foregoing process the particles of glass are never completely fused together into a continuous homogeneous phase, but on the contrary, always maintain, to some extent, their granular character and are merely adhered together at their points of contact. Obviously a body of this character must be relatively low in mechanical strength.

The present invention is based upon the provision of a process in which carbon monoxide is employed as a reducing agent for sulfates and other materials reducible by carbon monoxide, to generate a gas directly within a body of fused glass. In the process the glass is first fused to a requisite state of fluidity and then the carbon monoxide is bubbled therethrough until a suitable degree of saturation of the glass is reached. At first the carbon monoxide appears simply to bubble through the glass mass without producing any substantial degree of cellulation. However, some of it probably goes into solution, thus effecting intimate contact with sulfates and the like in the glass. After it has been bubbled for an appreciable period of time, a chemical reaction appears to be initiated directly within the glass and as a result the latter rapidly foams up into a highly cellulated state. If, when the glass has been expanded to desired volume, the addition of carbon monoxide is stopped and the mass is chilled, the bubbles, which exist in very fine form and are relatively uniformly distributed throughout the mass, are entrapped so that when the glass is chilled and annealed a permanent foam, of completely closed bubbles having high insulating value, high resistance to permeation by liquids and, with all, a very substantial degree of mechanical strength, is obtained. The treatment of the molten glass in order to form the cellulated bodies may be conducted in molds so that the mass, when cooled, has the desired shape and size, or if preferred relatively large sheets or rods may be formed and these subsequently mechanically cut to desired form and size.

In the practice of the invention ordinary glass, such as disclosed in the British patent, or a window glass or bottle glass consisting primarily of sand, lime and soda-ash or an equivalent amount of other ingredients and preferably containing some sulfates, is brought to a suitable temperature in a mold, or if desired in a pot or tank. Carbon monoxide is then bubbled into the mass at any convenient rate. For a few minutes, e. g. 2 or 3 minutes, the gas simply bubbles through the mass, but within a short time chemical reaction sets in and proceeds rapidly with the production of innumerable small bubbles throughout the mass. If the glass is heated too hot it becomes so fluid that the bubbles are to a large extent lost. For optimum results, the mass should be sufficiently viscous to maintain its foam-like character for considerable periods of time, i. e. until it sets or becomes non-fluid or very viscous. A suitable temperature is about 2200 to 2500° F. Bubbling is continued until the glass is sufficiently cellulated or expanded. A product having a density of about .4 to .8 or .9 (water equal to 1) can readily be obtained in this manner. Cellulation may be increased by placing the molds in a vacuum chamber while the contents are still viscous. The degree of vacuum will depend on the cellulation desired. When the cellulation has proceeded sufficiently far the flow of gas is interrupted and the mass is chilled as soon as is practicable, in order to entrap the bubbles. The cellulated mass may then be annealed by slow cooling, in order to relieve internal strains and thus to provide a stable body.

If preferred the glass may be cellulated in pots or tanks and while still in sufficiently fluid condition portions of it may be poured or fed in gobs or otherwise disposed in the molds. The portions in the molds may be expanded to insure complete filling of all spaces by application of slight vacuum. A smooth top surface of each block may be obtained by lightly pressing the expanded but soft mass with a cover plate. It is also contemplated that the glass may be cellulated by bubbling with carbon monoxide in columns or other containers and then allowed to extrude under slight pressure from nozzles or orifices of a desired cross-section to provide continuous rods or sheets which can be cut up to form units of appropriate size and shape.

Another mode of procedure would involve heating the glass to a temperature somewhat above softening, for example, 1800 to 2200° F., in order to render it fluid, but relatively viscous. The carbon monoxide should then be introduced into the mass. Some of the gas is absorbed by the molten but viscous glass. However, a portion of it doubtlessly is retained as bubbles which may be broken up by the agitation, into small sizes, thus obtaining an effective contact between the glass and it. After a sufficient amount of gas has been introduced, the glass may be heated up to a temperature of about 2300 to 2500°, thus causing the gasified mass to foam by reason of chemical reaction between the glass and the carbon monoxide.

Most glasses inherently contain considerable amounts of sulfates and other constituents, which, when contacted with carbon monoxide, produce gases in large volume. However, in event of lack of such constituents it is quite possible to add sodium sulfate, calcium sulfate, magnesium sulfate or mixtures of these ingredients in amounts up to 5 or 6% or even more to the molten glass, thus insuring an abundance of sulfate in the molten material.

The forms of the invention herein described are to be considered merely as exemplary and it will be apparent to those skilled in the art that numerous modifications may be made therein without departure from the spirit of the invention or the scope of the appended claim.

What I claim is:

A process of manufacturing a foam of glass, which process comprises bubbling carbon monoxide through molten but viscous glass containing sulfates, until a chemical reaction is induced as evidenced by sudden liberation of many small bubbles distributed throughout the glass, then chilling the resultant foamy mass to entrap the bubbles therein and annealing the product.

PHILLIP H. DEWEY.